United States Patent
Yang et al.

(10) Patent No.: US 12,095,501 B2
(45) Date of Patent: Sep. 17, 2024

(54) INTELLIGENT REAL-TIME FULL-FIELD MEASUREMENT METHOD AND SYSTEM FOR HIGH-REPETITION-RATE FEMTOSECOND PULSE

(71) Applicant: SOUTH CHINA UNIVERSITY OF TECHNOLOGY, Guangzhou (CN)

(72) Inventors: Zhongmin Yang, Guangzhou (CN); Xiaoxiao Wen, Guangzhou (CN); Yueyi Sun, Guangzhou (CN); Xiaoming Wei, Guangzhou (CN)

(73) Assignee: SOUTH CHINA UNIVERSITY OF TECHNOLOGY, Guangzhou (CN)

( * ) Notice: Subject to any disclaimer, the term of this patent is extended or adjusted under 35 U.S.C. 154(b) by 110 days.

(21) Appl. No.: 17/946,054

(22) Filed: Sep. 16, 2022

(65) Prior Publication Data

US 2023/0011819 A1    Jan. 12, 2023

Related U.S. Application Data

(63) Continuation of application No. PCT/CN2020/124572, filed on Oct. 29, 2020.

(30) Foreign Application Priority Data

May 30, 2020   (CN) .......................... 202010481026.8

(51) Int. Cl.
*H04B 10/079*   (2013.01)
(52) U.S. Cl.
CPC ................... *H04B 10/079* (2013.01)
(58) Field of Classification Search
CPC .................................................. H04B 10/079
(Continued)

(56) References Cited

U.S. PATENT DOCUMENTS

| 11,281,070 B2* | 3/2022 | Sun ..................... G02F 1/3501 |
| 2012/0093519 A1* | 4/2012 | Lipson ..................... G01J 11/00 398/157 |

(Continued)

FOREIGN PATENT DOCUMENTS

| CN | 105806495 | 7/2016 |
| CN | 110186577 | 8/2019 |

(Continued)

OTHER PUBLICATIONS

Shen et al; Dispersion and compensation of temporal pulse width for femtosecond pulse laser ranging; May 2014; Science direct; pp. 1-4. (Year: 2014).*

(Continued)

*Primary Examiner* — Amritbir K Sandhu
(74) *Attorney, Agent, or Firm* — JCIPRNET

(57) ABSTRACT

The present invention discloses an intelligent real-time full-field measurement method and system for a high-repetition-rate femtosecond pulse. The method includes: splitting a to-be-tested signal into n channels; performing a frequency reduction separation on each of the channels; splitting each channel of frequency-reduced time-domain demultiplexed signals into two signals, where a small dispersion component performs time-domain stretching on one signal, and a big dispersion component performs a time-frequency conversion on the other signal; acquiring time-domain intensity information of the to-be-tested signal after the stretching by the small dispersion component and frequency-domain envelope information of the to-be-tested signal after the time-frequency conversion by the big dispersion component; and continuously iterating the acquired time-domain intensity information and frequency-domain envelope information according to a Gerchberg-Saxton algorithm until a convergence is achieved, to obtain infor- (Continued)

mation about intensity and phase of the to-be-tested signal in a time domain and a frequency domain.

20 Claims, 1 Drawing Sheet

(58) Field of Classification Search
USPC .......................................................... 398/25
See application file for complete search history.

(56) References Cited

U.S. PATENT DOCUMENTS

| 2019/0120696 | A1* | 4/2019 | Wong | G01J 9/00 |
| 2020/0378835 | A1* | 12/2020 | Sun | G01J 11/00 |
| 2023/0184945 | A1* | 6/2023 | Wu | G01S 17/58 |
| | | | | 356/28.5 |

FOREIGN PATENT DOCUMENTS

| CN | 110186577 A | * | 8/2019 | ............. G01J 11/00 |
| CN | 110411587 | | 11/2019 | |
| CN | 110411954 A | * | 11/2019 | ........... G01N 21/255 |
| CN | 111595470 | | 8/2020 | |
| CN | 111678611 | | 9/2020 | |
| WO | 2017037402 | | 3/2017 | |

OTHER PUBLICATIONS

B.H. Kolner, "Space-time duality and the theory of temporal imaging," in IEEE Journal of Quantum Electronics, vol. 30, No. 8, Aug. 1994, pp. 1951-1963.
Rick Trebino and Daniel J. Kane, "Using phase retrieval to measure the intensity and phase of ultrashort pulses: frequency-resolved optical gating," Journal of the Optical Society of America A, vol. 10, Issue 5, May 1993, pp. 1101-1111.
Rick Trebino, "Measuring the seemingly immeasurable," Nature Photonics, vol. 5, Apr. 2011, pp. 189-192.
P. Ryczkowski et al., "Real-time full-field characterization of transient dissipative soliton dynamics in a mode-locked laser," Nature Photonics, vol. 12, Mar. 2018, pp. 221-227.
"International Search Report (Form PCT/ISA/210) of PCT/CN2020/124572," mailed on Feb. 26, 2021, with English translation thereof, pp. 1-5.

* cited by examiner

INTELLIGENT REAL-TIME FULL-FIELD MEASUREMENT METHOD AND SYSTEM FOR HIGH-REPETITION-RATE FEMTOSECOND PULSE

CROSS-REFERENCE TO RELATED APPLICATION

This application is a continuation of international application of PCT application serial no. PCT/CN2020/124572 filed on Oct. 29, 2020, which claims the priority benefit of China application no. 202010481026.8 filed on May 30, 2020. The entirety of each of the above mentioned patent applications is hereby incorporated by reference herein and made a part of this specification.

BACKGROUND

Technical Field

The present invention relates to the field of ultrafast signal measurements, and in particular to an intelligent real-time full-field measurement method and system for a high-repetition-rate femtosecond pulse.

Description of Related Art

Ultrafast pulse lasers are widely used in various disciplines due to the characteristics such as a short duration, high peak power, and a wide spectrum. Especially, ultrafast pulses with a high repetition rate attract more attention. How to measure full-field information of a high-repetition-rate ultrafast pulse in real time has become a key research subject for researchers.

Since the development of ultrafast measurement methods, there are many options: The autocorrelation measurement method can measure the intensity of a time domain, but fails to provide important information such as the original waveform and phase of the pulse. The time-lens time-domain measurement method has the problem that to-be-tested high-repetition-frequency signal pulses overlap (IEEE J. Quantum Elect. 30, 1951-1963 (1994)). The frequency-resolved optical gating method has become a main method for measuring full-field information of pulses, but cannot be performed in real time (J. Opt. Soc. Am. A 10, 1101 (1993)). In addition, the single-shot frequency-resolved optical gating method developed later has a fast measurement speed, but is only suitable for measuring ultrafast pulses with a low repetition rate (kHz) (Nat. Photon. 5, 189-192 (2011)). Dispersive Fourier transform technology combined with the Gerchberg-Saxton phase retrieval algorithm provides a reliable solution to measure full-field information of pulses, but also has the to-be-resolved problem of high-repetition-rate pulses overlapping (Nat. Photon. 12, 221-227 (2018)).

To measure high-repetition-rate ultrafast pulses in real time, the present invention provides an intelligent real-time full-field measurement method and system for a high-repetition-rate femtosecond pulse, to down-convert the to-be-measured pulse by using an optical splitting time domain demultiplexing method, avoiding the pulse overlapping problem due to a high repetition rate. According to a time-domain stretching technique and a phase retrieval algorithm, a high-speed signal collector acquires data, thereby measuring full-field information of a high-repetition-rate femtosecond pulse in real time. This method eliminates limitations in various aspects of the related art, and has a broad application prospect in the ultrafast measurement.

SUMMARY

An objective of the present invention is to provide an intelligent real-time full-field measurement method for a high-repetition-rate femtosecond pulse and a system thereof, to resolve the problem that a high repetition rate causes pulses to overlap, which cannot be resolved by using the existing measurement technique, thereby measuring full-field information.

The present invention can be implemented by using at least one of the following technical solutions:

An intelligent real-time full-field measurement method for a high-repetition-rate femtosecond pulse includes the following steps:

A, splitting, by an optical splitter component, a to-be-tested signal into n channels of time-domain demultiplexed signals;

B, performing, by a high-speed optoelectronic amplitude modulator, a frequency reduction separation on a pulse luster in each of the channels of time-domain demultiplexed signals in a time domain for demultiplexing, where a pulse repetition rate of the time-domain demultiplexed signal is changed to a quarter of that of the to-be-tested signal, that is, $RR_S/4$;

C, splitting, by a second optical coupler, each channel of frequency-reduced time-domain demultiplexed signals into two signals, where a small dispersion component performs time-domain stretching on one signal; and a big dispersion component performs a time-frequency conversion on the other signal, to map frequency-domain information of the to-be-tested signal to a time domain;

D, acquiring, by a high-speed-signal acquisition component, time-domain intensity information of the to-be-tested signal after the stretching by the small dispersion component and frequency-domain envelope information of the to-be-tested signal after the time-frequency conversion by the big dispersion component; and E, assigning, by a data processing component, an initial phase to the acquired time-domain intensity information and frequency-domain envelope information of the to-be-tested signal, and continuously iterating the information according to a Gerchberg-Saxton algorithm until a convergence is achieved, to obtain information about intensity and phase of the to-be-tested signal in the time domain and a frequency domain, thereby measuring full-field information of a high-repetition-rate femtosecond pulse in real time.

Further, the to-be-tested signal is a to-be-tested femtosecond pulse signal with a repetition rate $RR_S$.

Further, the high-speed optoelectronic amplitude modulator performs modulation by using an arbitrary waveform generator, to generate a square wave signal of which a repetition rate is $RR_S/4$, and a duration is far greater than that of a single pulse of the to-be-tested signal.

Further, a latter square wave signal of the high-speed optoelectronic amplitude modulator is delayed by $1/RR_S$ from a previous square wave signal of the high-speed optoelectronic amplitude modulator.

A system for implementing the intelligent real-time full-field measurement method for a high-repetition-rate femtosecond pulse includes: an optical splitter component, an arbitrary waveform generator, n high-speed optoelectronic amplitude modulators, n second optical couplers, n small dispersion components, n big dispersion components, a high-speed-signal acquisition component, and a data processing component, where the optical splitter component includes a plurality of first optical couplers configured to split the to-be-tested signal into n channels of pulses;

the arbitrary waveform generator generates modulation signals for the n high-speed optoelectronic amplitude modulators;

the n pulses are connected to n high-speed optoelectronic amplitude modulators in a one-to-one correspondence, and the high-speed optoelectronic amplitude modulator is configured to modulate a time domain of the to-be-tested signal, to realize time-domain demultiplexing frequency reduction separation, and form n channels of time-domain demultiplexed signals;

the n channels of time-domain demultiplexed signals are connected to n optical couplers in a one-to-one correspondence, the optical coupler is configured to split each channel of time-domain demultiplexed signals into two signals, a small dispersion component performs time-domain stretching on one signal, and a big dispersion component performs a time-frequency conversion on the other signal, to map frequency-domain information of the to-be-tested signal to a time domain; and the n channels of time-domain demultiplexed signals form a total of 2 n signals;

the n small dispersion components are connected to n signals in a one-to-one correspondence; and the n big dispersion components are connected to another n signals in a one-to-one correspondence;

the high-speed-signal acquisition component includes a high-speed photodetector and a high-speed oscilloscope, and is configured to convert optical signals of 2 n signals into electrical signals and acquire data in real time; and the data processing component is a computer device and configured to analyze and process acquired information.

Further, the n small dispersion components and the n big dispersion components are all dispersive fibers.

Further, a dispersion quantity of each of the small dispersion components is $D_1$, and a dispersion quantity of each of the big dispersion components is $D_2$, where $|D_2|>|D_1|$.

Further, the dispersion quantity $D_2$ of each of the big dispersion components meets the following far-field diffraction condition:

$$l \gg \frac{\tau_0^2}{2\pi|\beta_2|},$$

where l represents a length of the dispersive fiber, $\tau_0$ represents a width of a to-be-tested pulse, $\beta_2$ represents a second-order dispersion coefficient of the big dispersive fiber, $\lambda_0$ represents a spectral width of the to-be-tested pulse, and c represents a light speed in vacuum.

This system includes but is not limited to applications in fields such as ultrafast measurement and ultrafast imaging.

In the present invention, a high repetition rate pulse is split, and its frequency is reduced through optical time-domain demultiplexing, to resolve the pulse overlapping problem in the frequency domain measurement of the traditional dispersive Fourier transform technique. In this case, through time-domain stretching with two different dispersion quantities, intensity information after the time-domain stretching by a small dispersion component and frequency-domain envelope information after a time-frequency conversion by a big dispersion component are obtained. The Gerchberg-Saxton algorithm is used to reconstruct the phase of a to-be-tested signal, to obtain the information about intensity and phase of the to-be-tested signal in the time domain and frequency domain, thereby measuring full-field information of a high-repetition-rate femtosecond pulse laser in real time. Compared with the related art, the present invention has at least one of the following advantages.

1. The present invention breaks through the limitation of a low repetition rate detected by using the existing ultrafast measurement technology, and measures a high repetition rate pulse.
2. The present invention realizes full-field measurement of pulse information while the high repetition rate is considered, and can obtain the time domain, frequency domain and corresponding phase information of the pulse.
3. The present invention realizes the real-time measurement by using the frequency reduction separation method.
4. The present invention involves a simple principle and optical path structure, to provide a simple ultrafast scheme for measuring full-field information of high repetition rate in real time.

DESCRIPTION OF THE EMBODIMENTS

The following clearly and completely describes the technical solutions in the embodiments of the present invention with reference to the accompanying drawings in the embodiments of the present invention.

Figure 1:
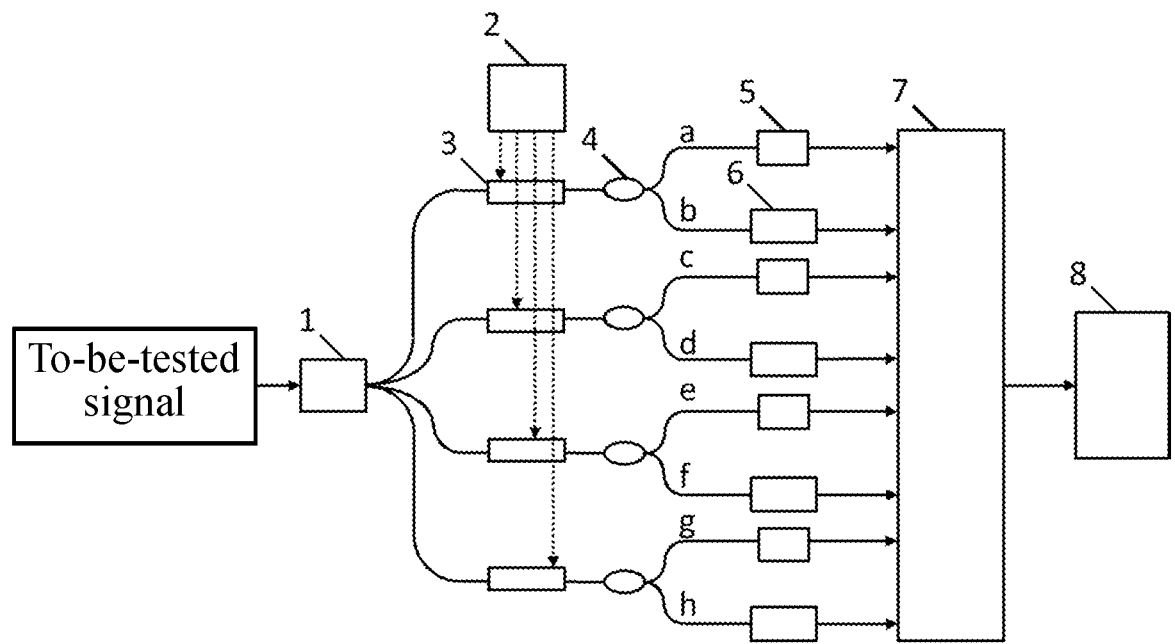
FIG. 1 is a schematic structural diagram of an intelligent real-time full-field measurement system for a high-repetition-rate femtosecond pulse according to an embodiment.
Figure 2:
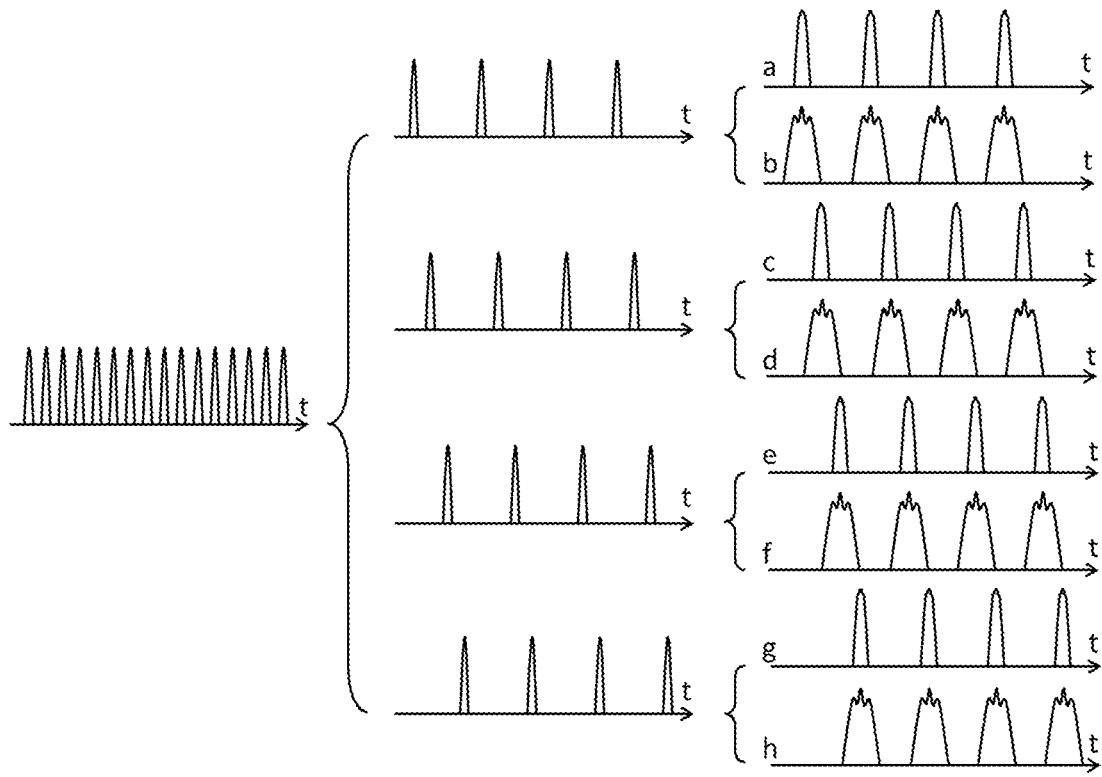
FIG. 2 is a schematic diagram of a principle of an intelligent real-time full-field measurement method for a high-repetition-rate femtosecond pulse according to an embodiment.

As shown in FIG. 1 and FIG. 2, an intelligent real-time full-field measurement system for a high-repetition-rate femtosecond pulse includes an optical splitter component 1, an arbitrary waveform generator 2, four high-speed optoelectronic amplitude modulators 3, four second optical couplers 4, four small dispersion components 5, four big dispersion components 6, a high-speed-signal acquisition component 7, and a data processing component 8.

The optical splitter component 1 includes three first optical couplers. Two of the first optical couplers are both connected to one output end of one first optical coupler, to split a to-be-tested signal 1 into 4 channels of pulses.

The high-speed-signal acquisition component 7 includes a high-speed photodetector and a high-speed oscilloscope connected thereto.

Four output ends of the three first optical couplers generated through connection are connected to input ends of the four high-speed optoelectronic amplitude modulators 3 in a one-to-one correspondence. The output ends of the four high-speed optoelectronic amplitude modulators 3 are connected to input ends of the four second optical couplers 4 in a one-to-one correspondence. The four high-speed optoelectronic amplitude modulators 3 are all connected to the arbitrary waveform generator 2. One output end of the second optical coupler 4 is connected to an input end of one small dispersion component 5 in a one-to-one correspondence. Another output end of the second optical coupler 4 is connected to an input end of one big dispersion component 6 in a one-to-one correspondence. Output ends of the four small dispersion components 5 and the four big dispersion components 6 are connected to an input end of the high-speed photodetector. The high-speed oscilloscope is connected to the data processing component 8. The data processing component is a computer device and configured to analyze and process acquired information.

The to-be-tested signal is a to-be-tested femtosecond pulse signal with a high repetition rate of 1 GHz, and the to-be-tested signal is a pulse laser generated by a device such as an optical maser.

The small dispersion component 5 and the big dispersion component 6 are all dispersive fibers. A dispersion quantity of the small dispersion component 5 is $D_1$, and a dispersion quantity of the big dispersion component 6 is $D_2$, where $|D_2|>|D_1|$.

If the frequency-domain information is mapped to a time domain, the dispersion quantity $D_2$ of the big dispersion component needs to meet the following far-field diffraction condition:

$$l \gg \frac{\tau_0^2}{2\pi|\beta_2|},$$

where
l represents a length of the dispersive fiber, $\tau_0$ represents a width of a to-be-tested pulse, $\beta_2$ represents a second-order dispersion coefficient of the big dispersive fiber, $\lambda_0$ represents a spectral width of the to-be-tested pulse, and c represents a light speed in vacuum.

FIG. 2 shows an intelligent real-time full-field measurement method for a high-repetition-rate femtosecond pulse, including the following steps:
a. An optical splitter component 1 splits a to-be-tested signal pulse with a repetition rate of 1 GHz into four channels of pulses with a repetition rate of 250 MHz in a time domain.
b. The four channels of pulses are correspondingly inputted into four high-speed optoelectronic amplitude modulators 3, to form four channels of time-domain demultiplexed signals; and a high-speed optoelectronic amplitude modulator 3 performs a frequency reduction separation on a pulse luster in each channel of pulses in a time domain for demultiplexing, where a second pulse is delayed by 1 ns from a first pulse in an aspect of time t, a third pulse is delayed by 1 ns from the second pulse, and a fourth pulse is delayed by 1 ns from the third pulse, and pulse repetition frequencies of the four channels of time-domain demultiplexed signals are each changed to a quarter of that of the to-be-tested signal.

The four high-speed optoelectronic amplitude modulators 3 perform modulation by using an arbitrary waveform generator 2.
c. The four channels of time-domain demultiplexed signals formed by using the high-speed optoelectronic amplitude modulators 3 are correspondingly inputted into four second optical couplers 4; and each channel of time-domain demultiplexed signals are split by one second optical coupler 4 into two signals, where a small dispersion component 5 performs time-domain stretching on one signal; and a big dispersion component 6 performs a time-frequency conversion on the other signal, to map frequency-domain information of the to-be-tested signal to a time domain.

Specifically, the four channels of time-domain demultiplexed signals form eight signals (a, b, c, d, e, f, g, and h). Some signals (a, c, e, and g) each correspond to a small dispersion component 5 for the time-domain stretching; and the other signals (b, d, f, and h) each correspond to a big dispersion component 6 for a time-frequency conversion, to map the frequency-domain information of the to-be-tested signal to the time domain.
d. A high-speed photodetector and a high-speed oscilloscope acquire in real time time-domain intensity information $I_1(t)$ of the to-be-tested signal after the stretching by the small dispersion component 5 and frequency-domain envelope information of the to-be-tested signal after the time-frequency conversion by the big dispersion component 6.
e. A data processing component 8 assigns an initial phase to the acquired intensity information $I_1(t)$ and the envelope information $I_2(t)$, and continuously iterates the information according to a Gerchberg-Saxton algorithm until a convergence is achieved, to obtain information about intensity and phase of the to-be-tested signal in the time domain and a frequency domain, thereby measuring full-field information of a high-repetition-rate femtosecond pulse in real time.

The foregoing embodiment is one of the implementations of the present invention, but the implementations of the present invention are not limited by the embodiment and test examples. Any other changes, modifications, substitutions, combinations, and simplifications that do not deviate from the spirit and principle of the present invention should be equivalent substitutions and are included within the protection scope of the present invention.

What is claimed is:

1. An intelligent real-time full-field measurement method for a high-repetition-rate femtosecond pulse, the method comprising the following steps:
splitting, by an optical splitter component, a to-be-tested signal into n channels of time-domain demultiplexed signals, where n is an integer and n is greater than 1;
performing, by a high-speed optoelectronic amplitude modulator, a frequency reduction separation on a pulse luster in each of the n channels of the time-domain demultiplexed signals in a time domain for demultiplexing, wherein a pulse repetition rate of the time-domain demultiplexed signals is changed to a quarter of that of the to-be-tested signal, that is, $RR_s/4$, wherein RRs is signal pulse repetition rate;
splitting, by a second optical coupler, each channel of frequency-reduced time-domain demultiplexed signals into two signals, wherein a small dispersion component performs time-domain stretching on one of the two signals; and a big dispersion component performs a time-frequency conversion on another one of the two signals, to map frequency-domain information of the to-be-tested signal to a time domain;
acquiring, by a high-speed-signal acquisition component, time-domain intensity information of the to-be-tested signal after the stretching by the small dispersion component and frequency-domain envelope information of the to-be-tested signal after the time-frequency conversion by the big dispersion component; and assigning, by a data processing component, an initial phase to the acquired time-domain intensity information and the acquired frequency-domain envelope information of the to-be-tested signal, and continuously iterating the acquired time-domain intensity information and the acquired frequency-domain envelope information according to a Gerchberg-Saxton algorithm until a convergence is achieved, to obtain information about intensity and phase of the to-be-tested signal in the time domain and a frequency domain, thereby measuring full-field information of the high-repetition-rate femtosecond pulse in real time.

2. The intelligent real-time full-field measurement method for the high-repetition-rate femtosecond pulse according to claim 1, wherein the to-be-tested signal is a to-be-tested femtosecond pulse signal with a repetition rate of $RR_S$.

3. The intelligent real-time full-field measurement method for the high-repetition-rate femtosecond pulse according to claim 1, wherein the high-speed optoelectronic amplitude modulator performs modulation by using an arbitrary waveform generator, to generate a square wave signal of which the repetition rate is $RR_S/4$, and a duration is greater than that of a single pulse of the to-be-tested signal.

4. The intelligent real-time full-field measurement method for the high-repetition-rate femtosecond pulse according to claim 3, wherein a latter square wave signal of the high-speed optoelectronic amplitude modulator is delayed by $1/RR_S$ from a previous square wave signal of the high-speed optoelectronic amplitude modulator.

5. A system for implementing the intelligent real-time full-field measurement method for a high-repetition-rate femtosecond pulse according to claim 1, comprising: an optical splitter component, an arbitrary waveform generator, n high-speed optoelectronic amplitude modulators, n second optical couplers, n small dispersion components, n big dispersion components, a high-speed-signal acquisition component, and a data processing component, wherein
the optical splitter component comprises a plurality of first optical couplers configured to split a to-be-tested signal into n channels of pulses;
the arbitrary waveform generator generates modulation signals for the n high-speed optoelectronic amplitude modulators;
the n channels of pulses are connected to the n high-speed optoelectronic amplitude modulators in a one-to-one correspondence, and the high-speed optoelectronic amplitude modulator is configured to modulate a time domain of the to-be-tested signal, to realize time-domain demultiplexing frequency reduction separation, and form n channels of time-domain demultiplexed signals;
the n channels of the time-domain demultiplexed signals are connected to the n second optical couplers in a one-to-one correspondence, one of the second optical couplers is configured to split each channel of the time-domain demultiplexed signals into two signals, a small dispersion component performs time-domain stretching on one of the two signals, and a big dispersion component performs a time-frequency conversion on another one of the two signals, to map frequency-domain information of the to-be-tested signal to a time domain; and the n channels of the time-domain demultiplexed signals form a total of 2n signals;
the n small dispersion components are connected to n signals of the 2n signals in a one-to-one correspondence; and the n big dispersion components are connected to another n signals of the 2n signals in a one-to-one correspondence;
the high-speed-signal acquisition component comprises a high-speed photodetector and a high-speed oscilloscope, and is configured to convert optical signals of the 2n signals into electrical signals and acquire data in real time; and
the data processing component is a computer device and configured to analyze and process acquired information.

6. The system according to claim 5, wherein the n small dispersion components and the n big dispersion components are all dispersive fibers.

7. The system according to claim 5, wherein a dispersion quantity of each of the n small dispersion components is $D_1$, and a dispersion quantity of each of the n big dispersion components is $D_2$, wherein $|D_2|>|D_1|$.

8. The system according to claim 7, wherein the dispersion quantity $D_2$ of each of the n big dispersion components meets the following far-field diffraction condition:

$$l \gg \frac{\tau_0^2}{2\pi|\beta_2|},$$

wherein
l represents a length of a dispersive fiber, $\tau_0$ represents a width of a to-be-tested pulse, $\beta_2$ represents a second-order dispersion coefficient of a big dispersive fiber, $\lambda_0$ represents a spectral width of the to-be-tested pulse, and c represents a light speed in vacuum.

9. A system for implementing the intelligent real-time full-field measurement method for a high-repetition-rate femtosecond pulse according to claim 2, comprising: an optical splitter component, an arbitrary waveform generator, n high-speed optoelectronic amplitude modulators, n second optical couplers, n small dispersion components, n big dispersion components, a high-speed-signal acquisition component, and a data processing component, wherein
the optical splitter component comprises a plurality of first optical couplers configured to split a to-be-tested signal into n channels of pulses;
the arbitrary waveform generator generates modulation signals for the n high-speed optoelectronic amplitude modulators;
the n channels of pulses are connected to the n high-speed optoelectronic amplitude modulators in a one-to-one correspondence, and the high-speed optoelectronic amplitude modulator is configured to modulate a time domain of the to-be-tested signal, to realize time-domain demultiplexing frequency reduction separation, and form n channels of time-domain demultiplexed signals;
the n channels of the time-domain demultiplexed signals are connected to the n second optical couplers in a one-to-one correspondence, one of the second optical couplers is configured to split each channel of the time-domain demultiplexed signals into two signals, a small dispersion component performs time-domain stretching on one of the two signals, and a big dispersion component performs a time-frequency conversion on another one of the two signals, to map frequency-domain information of the to-be-tested signal to a time domain; and the n channels of the time-domain demultiplexed signals form a total of 2n signals;

the n small dispersion components are connected to n signals of the 2n signals in a one-to-one correspondence; and the n big dispersion components are connected to another n signals of the 2n signals in a one-to-one correspondence;

the high-speed-signal acquisition component comprises a high-speed photodetector and a high-speed oscilloscope, and is configured to convert optical signals of the 2n signals into electrical signals and acquire data in real time; and the data processing component is a computer device and configured to analyze and process acquired information.

10. A system for implementing the intelligent real-time full-field measurement method for a high-repetition-rate femtosecond pulse according to claim 3, comprising: an optical splitter component, an arbitrary waveform generator, n high-speed optoelectronic amplitude modulators, n second optical couplers, n small dispersion components, n big dispersion components, a high-speed-signal acquisition component, and a data processing component, wherein the optical splitter component comprises a plurality of first optical couplers configured to split a to-be-tested signal into n channels of pulses;

the arbitrary waveform generator generates modulation signals for the n high-speed optoelectronic amplitude modulators;

the n channels of pulses are connected to the n high-speed optoelectronic amplitude modulators in a one-to-one correspondence, and the high-speed optoelectronic amplitude modulator is configured to modulate a time domain of the to-be-tested signal, to realize time-domain demultiplexing frequency reduction separation, and form n channels of time-domain demultiplexed signals;

the n channels of the time-domain demultiplexed signals are connected to the n second optical couplers in a one-to-one correspondence, one of the second optical couplers is configured to split each channel of the time-domain demultiplexed signals into two signals, a small dispersion component performs time-domain stretching on one of the two signals, and a big dispersion component performs a time-frequency conversion on another one of the two signals, to map frequency-domain information of the to-be-tested signal to a time domain; and the n channels of the time-domain demultiplexed signals form a total of 2n signals;

the n small dispersion components are connected to n signals of the 2n signals in a one-to-one correspondence; and the n big dispersion components are connected to another n signals of the 2n signals in a one-to-one correspondence;

the high-speed-signal acquisition component comprises a high-speed photodetector and a high-speed oscilloscope, and is configured to convert optical signals of the 2n signals into electrical signals and acquire data in real time; and the data processing component is a computer device and configured to analyze and process acquired information.

11. A system for implementing the intelligent real-time full-field measurement method for a high-repetition-rate femtosecond pulse according to claim 4, comprising: an optical splitter component, an arbitrary waveform generator, n high-speed optoelectronic amplitude modulators, n second optical couplers, n small dispersion components, n big dispersion components, a high-speed-signal acquisition component, and a data processing component, wherein the optical splitter component comprises a plurality of first optical couplers configured to split a to-be-tested signal into n channels of pulses;

the arbitrary waveform generator generates modulation signals for the n high-speed optoelectronic amplitude modulators;

the n channels of pulses are connected to the n high-speed optoelectronic amplitude modulators in a one-to-one correspondence, and the high-speed optoelectronic amplitude modulator is configured to modulate a time domain of the to-be-tested signal, to realize time-domain demultiplexing frequency reduction separation, and form n channels of time-domain demultiplexed signals;

the n channels of the time-domain demultiplexed signals are connected to the n second optical couplers in a one-to-one correspondence, one of the second optical couplers is configured to split each channel of the time-domain demultiplexed signals into two signals, a small dispersion component performs time-domain stretching on one of the two signals, and a big dispersion component performs a time-frequency conversion on another one of the two signals, to map frequency-domain information of the to-be-tested signal to a time domain; and the n channels of the time-domain demultiplexed signals form a total of 2n signals;

the n small dispersion components are connected to n signals of the 2n signals in a one-to-one correspondence; and the n big dispersion components are connected to another n signals of the 2n signals in a one-to-one correspondence;

the high-speed-signal acquisition component comprises a high-speed photodetector and a high-speed oscilloscope, and is configured to convert optical signals of the 2n signals into electrical signals and acquire data in real time; and the data processing component is a computer device and configured to analyze and process acquired information.

12. The system according to claim 9, wherein the n small dispersion components and the n big dispersion components are all dispersive fibers.

13. The system according to claim 9, wherein a dispersion quantity of each of the n small dispersion components is $D_1$, and a dispersion quantity of each of the n big dispersion components is $D_2$, wherein $|D_2|>|D_1|$.

14. The system according to claim 13, wherein the dispersion quantity $D_2$ of each of the n big dispersion components meets the following far-field diffraction condition:

$$l \gg \frac{\tau_0^2}{2\pi|\beta_2|},$$

wherein l represents a length of a dispersive fiber, $\tau_0$ represents a width of a to-be-tested pulse, $\beta_2$ represents a second-order dispersion coefficient of a big dispersive fiber, $\lambda_0$ represents a spectral width of the to-be-tested pulse, and c represents a light speed in vacuum.

15. The system according to claim 10, wherein the n small dispersion components and the n big dispersion components are all dispersive fibers.

16. The system according to claim 10, wherein a dispersion quantity of each of the n small dispersion components is $D_1$, and a dispersion quantity of each of the n big dispersion components is $D_2$, wherein $|D_2|>|D_1|$.

17. The system according to claim 16, wherein the dispersion quantity $D_2$ of each of the n big dispersion components meets the following far-field diffraction condition:

$$l \gg \frac{\tau_0^2}{2\pi|\beta_2|},$$

wherein
l represents a length of a dispersive fiber, $\tau_0$ represents a width of a to-be-tested pulse, $\beta_2$ represents a second-order dispersion coefficient of a big dispersive fiber, $\lambda_0$ represents a spectral width of the to-be-tested pulse, and c represents a light speed in vacuum.

18. The system according to claim 11, wherein the n small dispersion components and the n big dispersion components are all dispersive fibers.

19. The system according to claim 11, wherein a dispersion quantity of each of the n small dispersion components is $D_1$, and a dispersion quantity of each of the n big dispersion components is $D_2$, wherein $|D_2|>|D_1|$.

20. The system according to claim 19, wherein the dispersion quantity $D_2$ of each of the n big dispersion components meets the following far-field diffraction condition:

$$l \gg \frac{\tau_0^2}{2\pi|\beta_2|},$$

wherein
l represents a length of a dispersive fiber, $\tau_0$ represents a width of a to-be-tested pulse, $\beta_2$ represents a second-order dispersion coefficient of a big dispersive fiber, $\lambda_0$ represents a spectral width of the to-be-tested pulse, and c represents a light speed in vacuum.

* * * * *